(12) United States Patent
Yamaguchi

(10) Patent No.: US 12,168,302 B2
(45) Date of Patent: Dec. 17, 2024

(54) GRASPING DEVICE, CONTROL METHOD, AND PROGRAM

(71) Applicant: TOHOKU UNIVERSITY, Sendai (JP)

(72) Inventor: Akihiko Yamaguchi, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 242 days.

(21) Appl. No.: 17/783,162

(22) PCT Filed: Dec. 16, 2019

(86) PCT No.: PCT/JP2019/049141
§ 371 (c)(1),
(2) Date: Jun. 7, 2022

(87) PCT Pub. No.: WO2021/124388
PCT Pub. Date: Jun. 24, 2021

(65) Prior Publication Data
US 2023/0017869 A1    Jan. 19, 2023

(51) Int. Cl.
*B25J 9/16* (2006.01)
(52) U.S. Cl.
CPC ................................ *B25J 9/1697* (2013.01)
(58) Field of Classification Search
CPC ...... B25J 9/6697; B25J 15/10; B25J 15/0004; B25J 15/0019; B25J 13/082; G05B 2219/39469; G05B 2219/40052
See application file for complete search history.

(56) References Cited

U.S. PATENT DOCUMENTS

| 10,981,272 B1* | 4/2021 | Nagarajan ............. B25J 9/1669 |
| 2008/0027582 A1 | 1/2008 | Obinata et al. |
| 2018/0050451 A1 | 2/2018 | Takanishi et al. |

(Continued)

FOREIGN PATENT DOCUMENTS

| CN | 102310409 A | 1/2012 |
| CN | 103963057 A | 8/2014 |

(Continued)

OTHER PUBLICATIONS

PCT International Search Report (w/ English translation) for corresponding Application No. PCT/JP2019/049141, mailed on Mar. 3, 2020, 4 pages.

(Continued)

*Primary Examiner* — Dalena Tran
(74) *Attorney, Agent, or Firm* — Dority & Manning, P.A.

(57) ABSTRACT

A grasping device includes: a grasping part module including a first surface and a second surface and configured to grasp an object between the first surface and the second surface; an arm part configured to change a position of the grasping part module; an imaging unit provided at a position that moves together with the grasping part module and configured to capture an image of at least a part of the object; and a control unit configured to control, based on specified amount information indicating a contact state in a case where a specified amount of the object and the first surface are in contact with each other, and information indicating a contact state captured by the imaging unit, at least one of the grasping part module and the arm part such that an amount of the object that is grasped approaches the specified amount.

7 Claims, 9 Drawing Sheets

(56) References Cited

U.S. PATENT DOCUMENTS

| | | | |
|---|---|---|---|
| 2021/0384355 A1* | 12/2021 | Sato | H01L 21/8234 |
| 2021/0394362 A1* | 12/2021 | Sodeyama | B25J 9/163 |
| 2022/0221357 A1* | 7/2022 | Elias | G01L 5/166 |

FOREIGN PATENT DOCUMENTS

| | | | |
|---|---|---|---|
| CN | 104081180 A | 10/2014 | |
| CN | 105313102 A | 2/2016 | |
| CN | 107775638 A | 3/2018 | |
| CN | 108830898 A | 11/2018 | |
| CN | 109937118 A | 6/2019 | |
| CN | 110065050 A | 7/2019 | |
| JP | 2005153114 A | 6/2005 | |
| JP | 2005257343 | 9/2005 | |
| JP | 2010069006 A | 4/2010 | |
| JP | 2010221358 A | 10/2010 | |
| JP | 2018027581 | 2/2018 | |
| JP | 2019025646 | 2/2019 | |
| JP | 2019027561 A | 2/2019 | |
| JP | 2019188587 A | 10/2019 | |
| JP | 2019198950 | 11/2019 | |
| WO | WO2018235214 | 12/2018 | |

OTHER PUBLICATIONS

Donlon, et al., "GelSlim: A High-Resolution, Compact, Robust, and Calibrated Tactile-sensing Finger," IEEE/RSJ International Conference on Intelligent Robots and Systems (IROS), Oct. 1-5, 2018, Madrid, Spain, pp. 1927-1934.

Extended European Search Report for corresponding Application No. EP19956491.5, mailed Aug. 17, 2023, 11 pages.

Yamaguchi Akihiko et al: "Combining finger vision and optical tactile sensing: Reducing and handling errors while cutting vegetables", 2016 IEEE-RAS 16th International Conference on Humanoid Robots (Humanoids), IEEE, Nov. 15, 2016 (Nov. 15, 2016), pp. 1045-1051.

Chinese Office Action (w/ partial English translation) for corresponding Application No. 201980102943.6, dated Dec. 26, 2023, 10 pages.

Japanese Office Action (w/ English translation) for corresponding JP Application No. 2021-565160, mailed May 30, 2023, 4 pages.

Chinese Office Action (w/ English translation) for corresponding Application No. 201980102943.6, dated Jul. 2, 2024, 21 pages.

* cited by examiner

GRASPING DEVICE, CONTROL METHOD, AND PROGRAM

CROSS REFERENCE TO RELATED APPLICATIONS

This application is the U.S. National Stage entry of International Application No. PCT/JP2019/049141 filed under the Patent Cooperation Treaty on Dec. 16, 2019, which is incorporated herein by reference.

TECHNICAL FIELD

The present invention relates to a grasping device, a control method, and a program.

BACKGROUND ART

In the related art, there is known a technique for grasping a grasping object by controlling a robot hand based on image information captured by an imaging unit provided on an upper part of the grasping object (see, for example, PTL 1).

CITATION LIST

Patent Literature

PTL 1: JP-A-2019-198950

SUMMARY OF INVENTION

Technical Problem

Here, there has been a request to grasp a specified amount of a flexible grasping object such as a prepared food by a robot hand and move the grasping object to a target location. However, when the robot hand according to the related art is used to grasp the specified amount of the flexible grasping object, there is a problem that an internal state of the flexible grasping object cannot be recognized from information captured by the imaging unit provided on the upper part of the grasping object.

That is, according to a method in the related art, there is a problem that it is difficult to estimate the specified amount of the flexible grasping object.

The invention has been made in view of such circumstances, and an object of the invention is to provide a grasping device capable of grasping a specified amount of a flexible grasping object, a control method, and a program.

Solution to Problem

A grasping device according to one aspect of the invention includes: a grasping part module including a first surface and a second surface and configured to grasp an object between the first surface and the second surface; an arm part configured to change a position of the grasping part module; an imaging unit provided at a position that moves together with the grasping part module and configured to capture an image of at least a part of the object; and a control unit configured to control, based on specified amount information indicating a contact state in a case where a specified amount of the object and the first surface are in contact with each other, and information indicating a contact state captured by the imaging unit when the grasping part module grasps at least a part of the object, at least one of the grasping part module and the arm part such that an amount of the object that is grasped approaches the specified amount.

In the grasping device according to one aspect of the invention, the imaging unit is provided on a back surface side of the first surface and at a position where an image of the object is able to be captured.

In the grasping device according to one aspect of the invention, the control unit is configured to control at least one of the grasping part module and the arm part based on the specified amount information and information indicating a contact state captured by the imaging unit when the grasping part module grasps at least a part of the object, the specified amount information being information indicating a ratio between a portion indicating a background and a portion indicating the object.

In the grasping device according to one aspect of the invention, the control unit is configured to control at least one of the grasping part module and the arm part based on the specified amount information and information indicating a contact state captured by the imaging unit when the grasping part module grasps at least a part of the object, the specified amount information being information indicating a ratio of a portion where luminance change of the object is large.

In the grasping device according to one aspect of the invention, the control unit is configured to control at least one of the grasping part module and the arm part based on the specified amount information and information indicating a contact state captured by the imaging unit when the grasping part module grasps at least a part of the object, the specified amount information being information indicating a color of the object.

A control method for a grasping device according to one aspect of the invention, the grasping device including: a grasping part module including a first surface and a second surface and configured to grasp an object between the first surface and the second surface; an arm part configured to change a position of the grasping part module; and an imaging unit provided at a position that moves together with the grasping part module and configured to capture an image of at least a part of the object, the control method includes: a control step of controlling, based on specified amount information indicating a contact state in a case where a specified amount of the object and the first surface are in contact with each other, and information indicating a contact state captured by the imaging unit when the grasping part module grasps at least a part of the object, at least one of the grasping part module and the arm part such that an amount of the object that is grasped approaches the specified amount.

A program according to an aspect of the invention is configured to cause a computer connected to a grasping device to execute a control step, in which the grasping device includes: a grasping part module including a first surface and a second surface and configured to grasp an object between the first surface and the second surface; an arm part configured to change a position of the grasping part module; and an imaging unit provided at a position that moves together with the grasping part module and configured to capture an image of at least a part of the object, and the control step is to control, based on specified amount information indicating a contact state in a case where a specified amount of the object and the first surface are in contact with each other, and information indicating a contact state captured by the imaging unit when the grasping part module grasps at least a part of the object, at least one of the grasping part module and the arm part such that an amount of the object that is grasped approaches the specified amount.

Advantageous Effect

According to the invention, it is possible to provide a grasping device capable of grasping a specified amount of a flexible grasping object, a control method, and a program.

DESCRIPTION OF EMBODIMENTS

[Configuration of Grasping Device 100]

Hereinafter, an embodiment of the invention will be described with reference to drawings.

Figure 1:
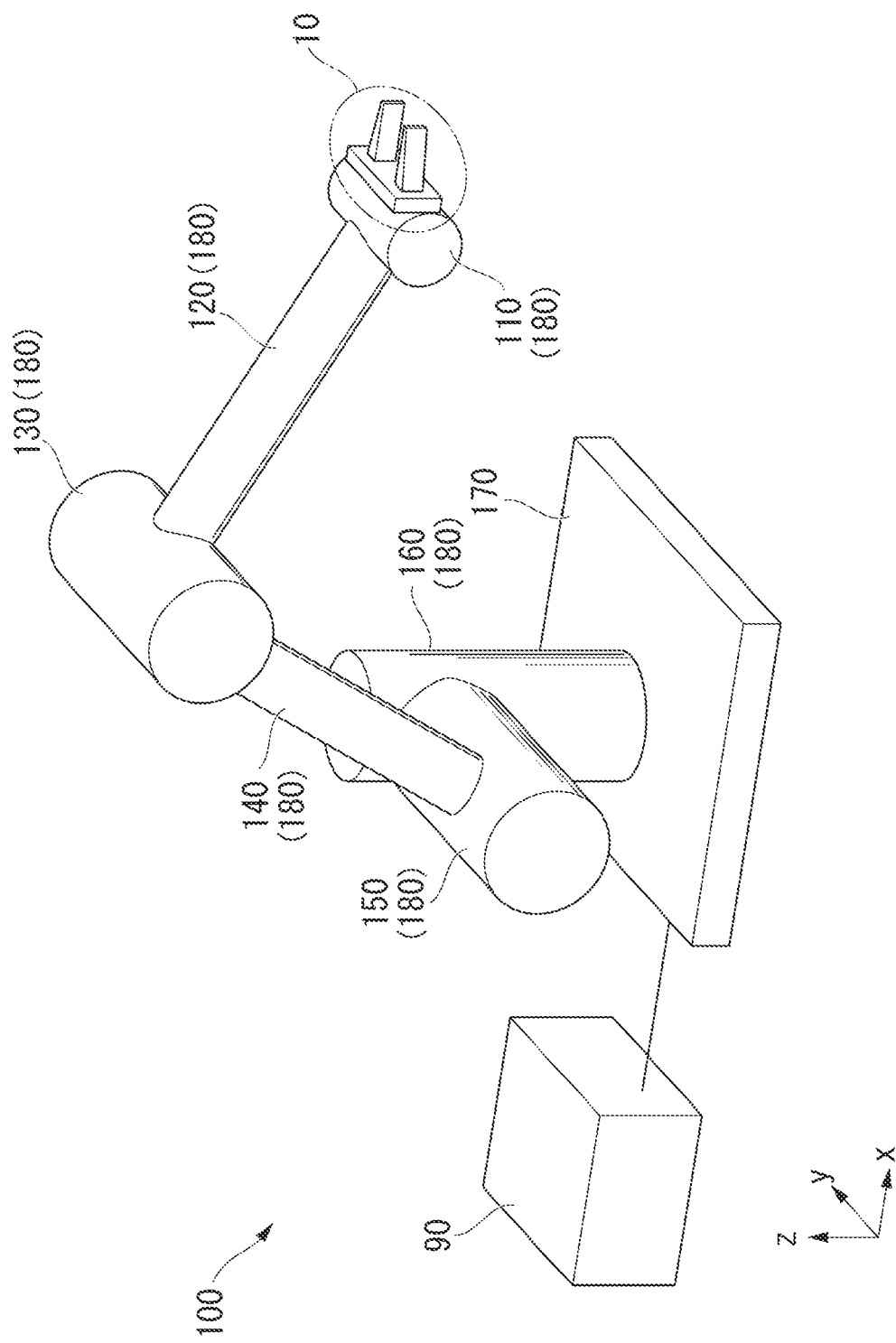
FIG. 1 is a diagram illustrating an example of a grasping device according to an embodiment.

FIG. 1 is a diagram illustrating an example of a configuration of a grasping device 100 according to an embodiment. A posture of the grasping device 100 is shown by a three-dimensional orthogonal coordinate system of an x axis, a y axis, and a z axis. The grasping device 100 according to the present embodiment detects a grasping state by coming into contact with a grasping object, and grasps a specified amount of the grasping object.

In the present embodiment, the grasping device 100 includes a grasping part module 10, a grasping device control unit 90 (or a control unit, the same applies to the following), a distal end part 110, an upper arm part 120, a joint part 130, a lower arm part 140, a main horizontal shaft part 150, a main vertical shaft part 160, and a base part 170. When the distal end part 110, the upper arm part 120, the joint part 130, the lower arm part 140, the main horizontal shaft part 150, and the main vertical shaft part 160 are not distinguished from one another, each of these parts is referred to as an arm part 180.

The base part 170 is a part connected to the main vertical shaft part 160.

The main vertical shaft part 160 is a part connecting the main horizontal shaft part 150 and the base part 170. The main vertical shaft part 160 is controlled by the grasping device control unit 90, and displaces the main horizontal shaft part 150 about a shaft of the main vertical shaft part 160.

The main horizontal shaft part 150 is a part connecting the lower arm part 140 and the main vertical shaft part 160. The main horizontal shaft part 150 is controlled by the grasping device control unit 90, and displaces the lower arm part 140 about a shaft of the main horizontal shaft part 150.

The lower arm part 140 is a part connecting the joint part 130 and the main horizontal shaft part 150.

The joint part 130 is a part connecting the upper arm part 120 and the lower arm part 140. The joint part 130 is controlled by the grasping device control unit 90, and displaces the upper arm part 120 about a shaft of the joint part 130.

The upper arm part 120 is a part connecting the distal end part 110 and the joint part 130.

The distal end part 110 is connected to the grasping part module 10. A posture (for example, a position and a direction) of the distal end part 110 is controlled by the grasping device control unit 90. A posture of the grasping part module 10 changes as the posture of the distal end part 110 changes.

The arm part 180 is not limited to this example as long as a position of the grasping part module 10 can be changed on any one of the x axis, the y axis, and the z axis. In this example, the arm part 180 has at least 6 degrees of freedom, and further has 7 degrees of freedom, including 1 degree of freedom, which is an interval between a grasping part 1 and a support part 2 included in the grasping part module 10.

The grasping part module 10 detects a contact state of the grasping object, and outputs information indicating the detected contact state of the grasping object to the grasping device control unit 90.

The grasping device control unit 90 acquires information output by the grasping part module 10. The grasping device control unit 90 drives the arm part 180 to change the position of the grasping part module 10. The grasping device control unit 90 performs control to change the position of the grasping part module 10 based on the information acquired from the grasping part module 10.

Figure 2:
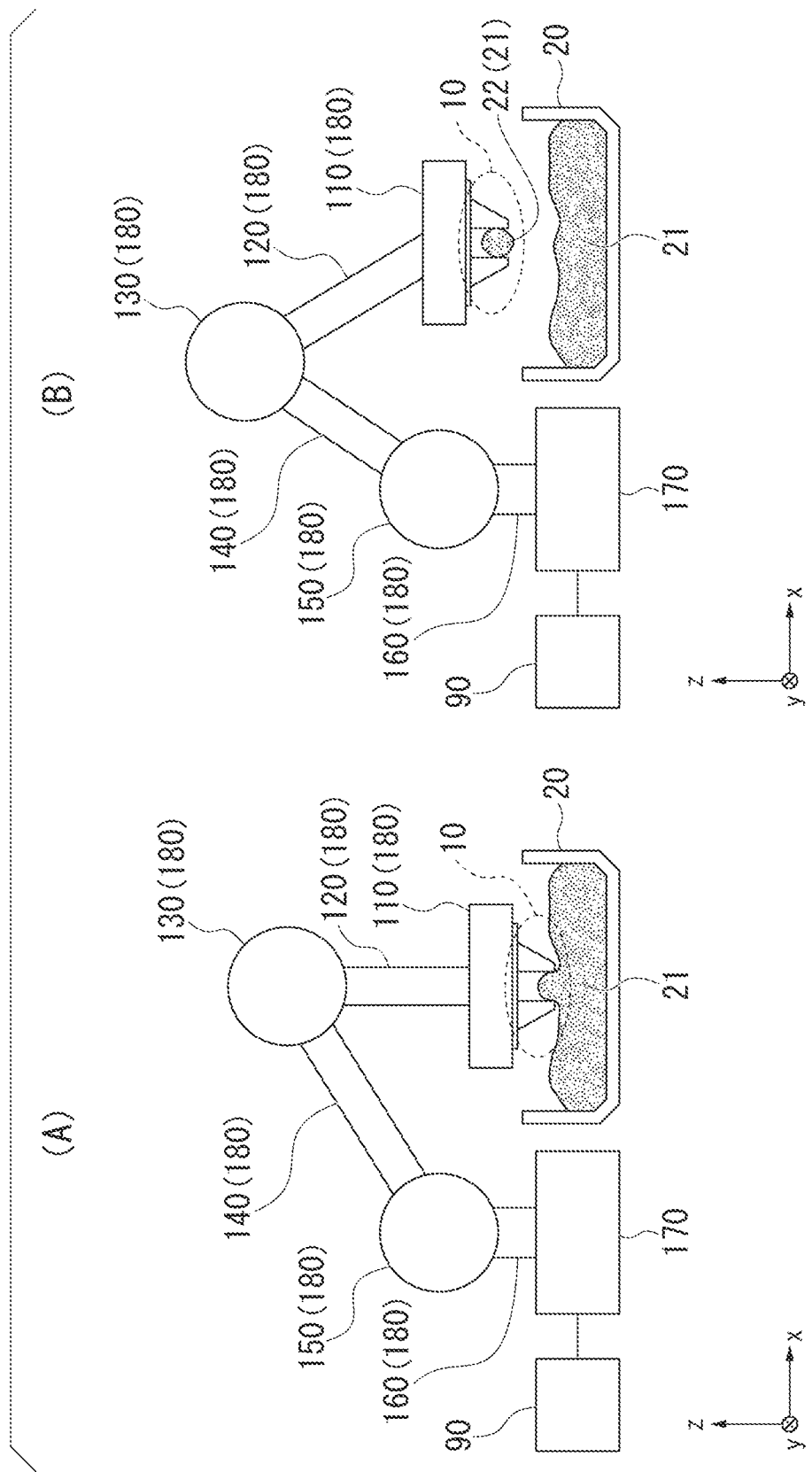
FIG. 2 is a diagram illustrating an example of a case where the grasping device according to the embodiment grasps a flexible grasping object.

FIG. 2 is a diagram illustrating an example of a case where the grasping device 100 according to the embodiment grasps a flexible grasping object 21. (A) in FIG. 2 illustrates an example of a case where the grasping device 100 comes into contact with the flexible grasping object 21 and acquires information indicating a contact state, and (B) in FIG. 2 illustrates an example of a case where the grasping device 100 grasps a specified amount 22 that is a part of the flexible grasping object 21. The posture of the grasping device 100 is shown by the three-dimensional orthogonal coordinate system of the x axis, the y axis, and the z axis.

In this example, the flexible grasping object 21 is accommodated in a container 20.

The example of the case where the grasping device 100 comes into contact with the flexible grasping object 21 and acquires the information indicating the contact state will be described with reference to (A) in FIG. 2.

The grasping device control unit 90 drives the arm part 180 to change the position of the grasping part module 10 with respect to the grasping object 21. In the same drawing, the grasping part module 10 is in contact with the grasping object 21. The grasping part module 10 acquires the information indicating the contact state between the grasping part module 10 and the grasping object 21, and provides the information to the grasping device control unit 90. The grasping device control unit 90 controls the arm part 180 based on the acquired information indicating the contact state between the grasping part module 10 and the grasping object 21.

The example of the case where the grasping device 100 grasps the specified amount 22, which is the part of the flexible grasping object 21, will be described with reference to (B) in FIG. 2.

The grasping device control unit 90 determines whether the grasping part module 10 grasps the specified amount 22 based on the information indicating the contact state between the grasping part module 10 and the grasping object 21. The information indicating the specified amount 22 may be stored in the grasping device control unit 90 or may be stored in an external storage unit 84.

The grasping device control unit 90 compares the information indicating the specified amount 22 with the information indicating the contact state between the grasping part module 10 and the grasping object 21, and when the specified amount 22 is smaller, the grasping device control unit 90 controls at least one of the arm part 180 and the grasping part module 10 so as to perform an operation for grasping a smaller amount. Such a control method is not particularly limited. For example, an amount of the grasping object may be reduced by operating the grasping part module 10 and changing an opening and closing amount between the grasping part 1 and the support part 2, or the amount of the grasping object may be reduced by raising the arm part 180, and further the amount of the grasping object may be reduced by appropriately combining the operation of the grasping part module 10 and the operation of the arm part 180. By performing such operation control, the information indicating the contact state between the grasping part module 10 and the grasping object 21 approaches the information indicating the specified amount 22, so that the amount of the grasping object grasped by the grasping part module 10 is controlled to approach the specified amount 22.

The grasping device control unit 90 compares the information indicating the specified amount 22 with the information indicating the contact state between the grasping part module 10 and the grasping object 21, and when the specified amount 22 is larger, the grasping device control unit 90 controls the at least one of the arm part 180 and the grasping part module 10 so as to perform an operation for grasping a larger amount. Such a control method is not particularly limited. For example, the amount of the grasping object may be increased by operating the grasping part module 10 and changing the opening and closing amount between the grasping part 1 and the support part 2, the amount of the grasping object may be increased by lowering the arm part 180, or the amount of the grasping object may be increased by appropriately combining the operation of the grasping part module 10 and the operation of the arm part 180. By performing such operation control, the information indicating the contact state between the grasping part module 10 and the grasping object 21 approaches the information indicating the specified amount 22, so that the amount of the grasping object grasped by the grasping part module 10 is controlled to approach the specified amount 22.

The grasping device control unit 90 compares the information indicating the specified amount 22 with the information indicating the contact state between the grasping part module 10 and the grasping object 21, and when the information indicating the contact state between the grasping part module 10 and the grasping object 21 is within a range of the information indicating the specified amount 22, the grasping device control unit 90 moves the specified amount 22 from the grasping object 21 to a target location.

For example, the grasping device 100 moves the specified amount 22 of the grasping object 21 accommodated in the container 20 to the target location located outside the container 20.

Figure 3:
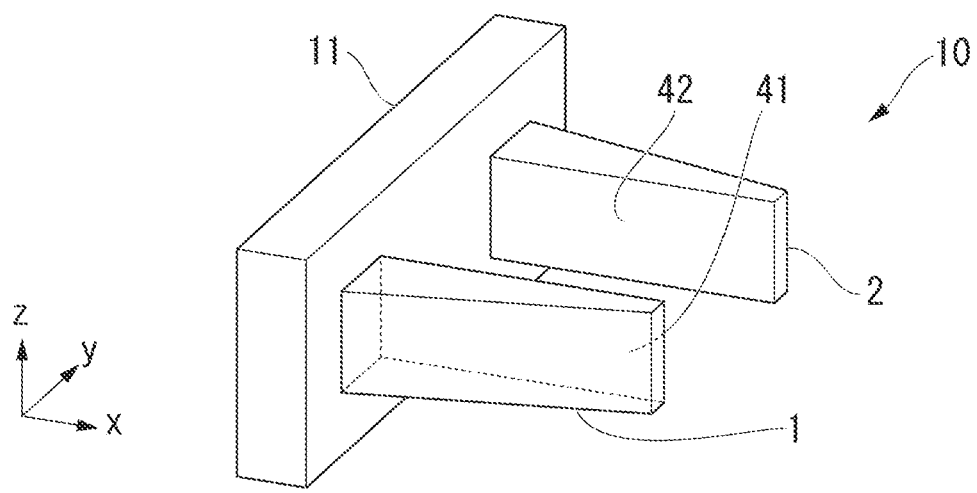
FIG. 3 is a diagram illustrating an example of a grasping part module according to the embodiment.

FIG. 3 is a diagram illustrating an example of the grasping part module 10 according to the embodiment. A configuration of the grasping part module 10 will be described with reference to the same drawing. The posture of the grasping part module 10 is shown by the three-dimensional orthogonal coordinate system of the x axis, the y axis, and the z axis.

The grasping part module 10 includes a connection part 11, the grasping part 1, and the support part 2.

The connection part 11 is a part connecting the distal end part 110, the grasping part 1, and the support part 2.

The grasping part 1 is connected to the connection part 11. The grasping part 1 includes a contact surface 41 that comes into contact with at least a part of the grasping object 21. Hereinafter, the contact surface 41 is also referred to as a first surface.

The support part 2 is connected to the connection part 11. The support part 2 includes a support surface 42 that comes into contact with at least a part of the grasping object 21. Hereinafter, the support surface 42 is also referred to as a second surface.

In this example, the grasping part 1 and the support part 2 are disposed in positions where the contact surface 41 and the support surface 42 face each other. The connection part 11 includes a driving device (not shown), and displaces at least the grasping part 1 in a y axis direction based on a grasping indication from the grasping device control unit 90. The grasping part module 10 grasps the grasping object 21 between the grasping part 1 and the support part 2 by driving at least the grasping part 1 in the y axis direction.

In this example, the connection part 11 is described as displacing the grasping part 1 in the y axis direction, but the support part 2 may be similarly configured to be displaced in the y axis direction.

In this example, the grasping part module 10 is described as grasping the grasping object 21 by the grasping part 1 and the support part 2, but the configuration of the grasping part module 10 is not limited to this example. For example, the grasping part module 10 may be implemented by a plurality of grasping parts 1, a plurality of support parts 2, or a combination of the plurality of grasping parts 1 and the plurality of support parts 2. In this case, the support surface 42 (second surface) is provided at a position where normal lines of the support surface 42 and the contact surface 41 (first surface) intersect with each other. For example, the support surface 42 (second surface) is provided at a position facing the contact surface 41 (first surface).

The grasping part 1 grasps at least a part of a predetermined amount of the grasping object 21 by the contact surface 41 (first surface) and the support surface 42 (second surface) of the support part 2.

Figure 4:
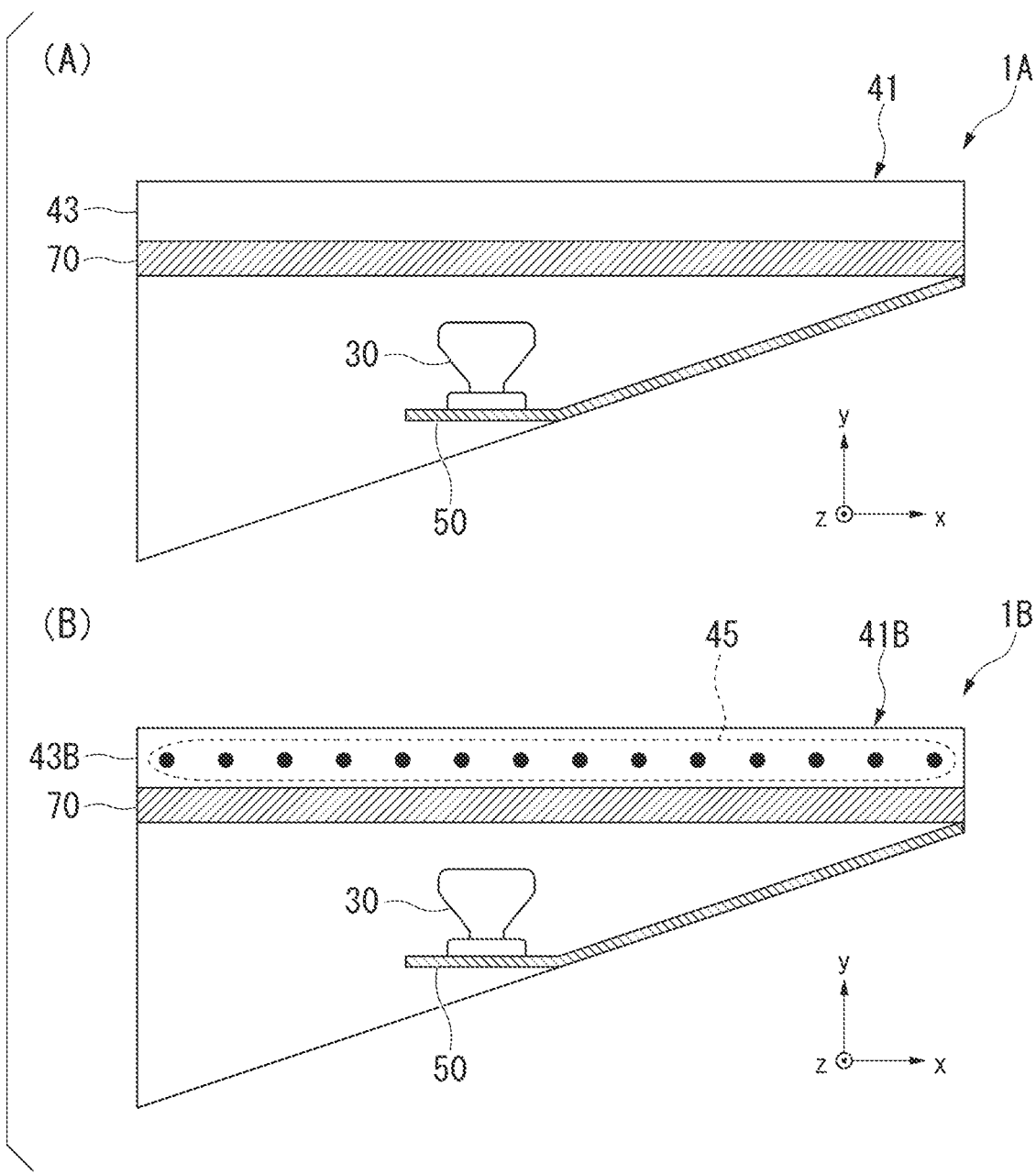
FIG. 4 is a diagram illustrating examples of a cross-sectional view of a grasping part according to the embodiment.

FIG. 4 is a diagram illustrating examples of a cross-sectional view of the grasping part 1 in the embodiment.

FIG. 4 shows cross-sectional views on an x-y plane of the grasping part 1 in FIG. 3. The direction of the grasping part module 10 is indicated by the three-dimensional orthogonal coordinate system of the x axis, the y axis, and the z axis.

(A) in FIG. 4 is a diagram illustrating an example of a cross-sectional view of a grasping part 1A in the embodiment. (B) in FIG. 4 is a diagram illustrating an example of a cross-sectional view of a grasping part 1B which is a modification of the grasping part 1 in the embodiment.

In a case where the support part 2 is configured to be drivable, the support part 2 may be configured to have a configuration the same as that of the grasping part 1.

The example of the configuration of the grasping part 1A will be described with reference to (A) in FIG. 4. In this example, the grasping part 1A detects the contact state between the grasping object 21 and the contact surface 41 by capturing an image of the grasping object 21.

The grasping part 1A in this example is an example of the grasping part 1. The grasping part 1 includes an imaging unit 30, a contact state detection unit 43, a hard layer 70, and a frame 50.

The frame 50 holds the imaging unit 30, the contact state detection unit 43, and the hard layer 70.

The contact state detection unit 43 includes the contact surface 41. The contact surface 41 is a surface that comes into contact with the grasping object 21. The contact state detection unit 43 detects the contact state between the grasping object 21 in contact with the contact surface 41 and the contact surface 41.

For example, when the contact state between the grasping object 21 in contact with the contact surface 41 and the contact surface 41 is detected by the image, the contact state detection unit 43 may be formed of a transparent material that transmits light.

The hard layer 70 is provided at a position in contact with the contact state detection unit 43. For example, the hard layer 70 may be made of a transparent and hard material such as acrylic.

Although the contact state detection unit 43 and the hard layer 70 are described as separate constituent elements in the present embodiment, the hard layer 70 may not be provided by implementing the contact state detection unit 43 and the hard layer 70 with the same member.

The imaging unit 30 is disposed on a back side of the contact surface 41 that can be in contact with the grasping object 21, of two surfaces of front and back surfaces of the contact state detection unit 43. Here, regarding the contact state detection unit, the contact surface 41 is a front surface, a side of the contact surface 41 is a front surface side, an opposite surface of the contact surface 41 is a back surface, and an opposite side of the contact surface 41 is a back surface side. More specifically, the imaging unit 30 is provided at a position where an image of the grasping object 21 can be taken from the back surface of the contact surface 41 (first surface) in contact with the grasping object 21.

In this example, the imaging unit 30 will be described as being provided inside the grasping part 1, but the position where the imaging unit 30 is provided is not limited to this example. The imaging unit 30 may be provided at a position that moves together with the grasping part module 10, which is at a distal end of the arm part 180. The imaging unit 30 may be provided at a position where an image indicating the contact state between at least a part of the grasping object 21 and the contact surface 41 (first surface) is captured.

The imaging unit 30 captures an image of the grasping object 21 in contact with the contact surface 41, and outputs information of the captured image to the grasping device control unit 90.

The example of the configuration of the grasping part 1B will be described with reference to (B) in FIG. 4. In this example, the grasping part 1B detects the contact state between the grasping object 21 and a contact surface 41B by displacement of a marker 45.

The grasping part 1B in this example is an example of the grasping part 1. The same configurations as those of the grasping part 1A are designated by the same reference numerals as those in (A) in FIG. 4, and the description thereof will be omitted.

The grasping part 1B is different from the grasping part 1A in that the marker 45 is provided in a contact state detection unit 43B. The contact state detection unit 43B includes the contact surface 41B. The contact state detection unit 43B is a modification of the contact state detection unit 43, and the contact surface 41B is a modification of the contact surface 41.

A plurality of markers 45 are disposed at predetermined positions of the contact state detection unit 43B. In this example, the marker 45 is an opaque member disposed at positions of grid points separated at equal intervals inside the contact state detection unit 43B. The marker 45 is disposed inside the contact state detection unit 43B, but the invention is not limited thereto, and the marker 45 may be provided on the contact surface 41B or may be provided on the back surface of the contact surface 41B. In addition, the marker 45 is described as being discretely disposed at the positions of the grid points, but the invention is not limited thereto. The marker 45 may be a grid pattern or other continuous patterns.

In this example, the contact state detection unit 43B is at least partially deformed along a shape of the grasping object 21 in contact with a transmission part contact surface 40 that is the contact surface. For example, when the contact state detection unit 43B is made of a transparent material, a specific material for the contact state detection unit 43B is a silicone material having a thickness of 2 millimeters and a transmittance of about 94 percent.

The position of the marker 45 is also displaced by the contact state detection unit 43B being at least partially deformed along the shape of the grasping object 21. The grasping device control unit 90 detects the contact state between the grasping object 21 and the contact surface 41B from the displacement of the marker 45 captured by the imaging unit 30.

The pattern of the marker 45 may be irregular patterns such that the contact state between the grasping object 21 and the contact surface 41B can be easily detected. The marker 45 is described as the opaque members, but the invention is not limited thereto, and the marker 45 may be a translucent member or a transparent member as long as the displacement when the grasping object and the contact surface are in contact with each other can be optically recognized.

The contact state detection unit 43 is not limited to the example illustrated in the drawing. The contact state detection unit 43 only needs to be able to detect the contact state of the grasping object 21, and for example, may be configured to detect the deformation of the contact state detection unit 43 by refraction of light. In this case, the contact state detection unit 43 may be configured not to transmit light from the contact surface 41 to the back surface of the contact surface 41.

Figure 5:
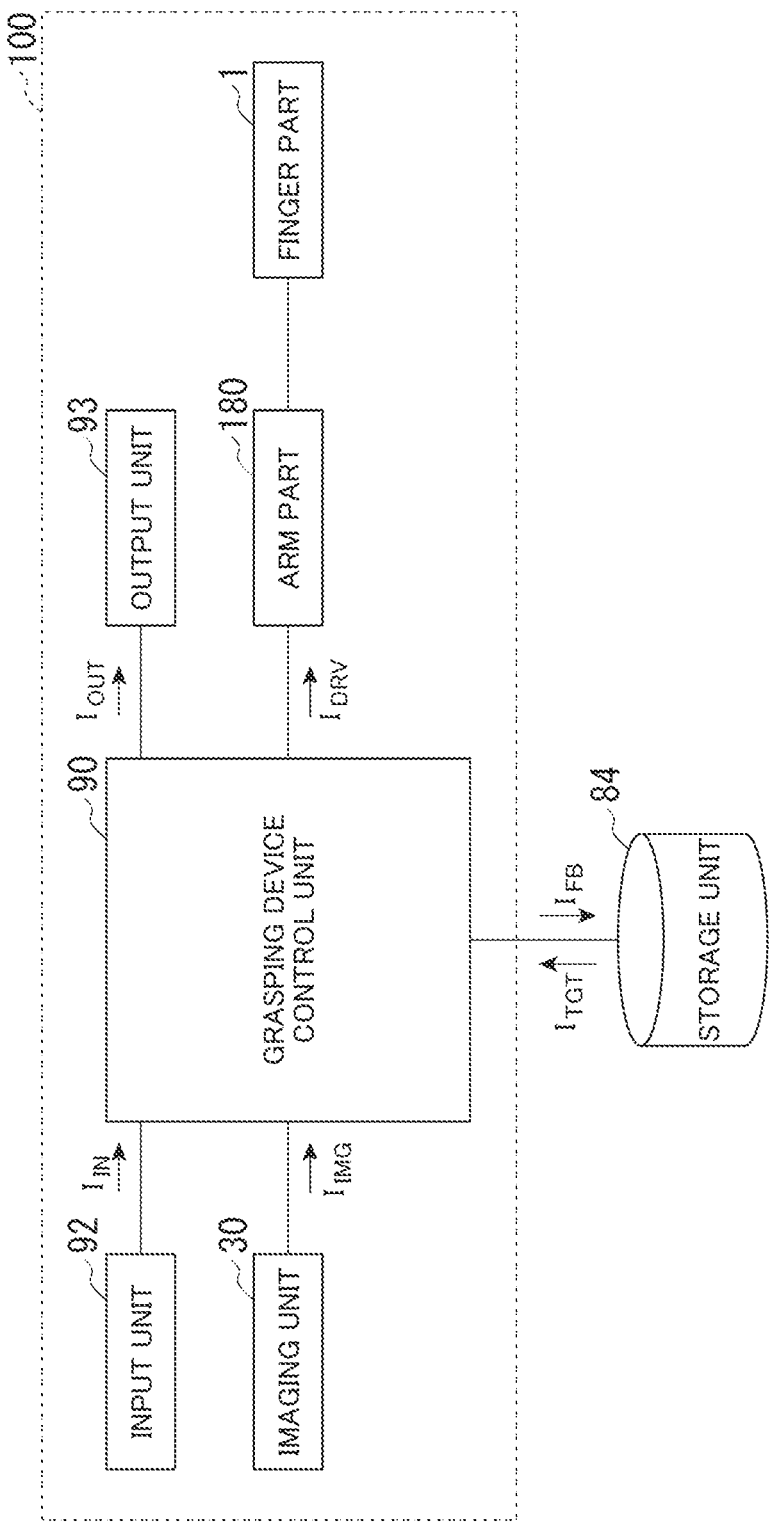
FIG. 5 is a diagram illustrating an example of a functional configuration of the grasping device according to the embodiment.

FIG. 5 is a diagram illustrating an example of a functional configuration of the grasping device 100 according to the embodiment.

The grasping device 100 includes, as functional configurations, the grasping device control unit 90, an input unit 92, an output unit 93, the imaging unit 30, the arm part 180, and the grasping part 1.

The grasping device control unit 90 includes a microcomputer (not shown), a memory such as a random access memory (RAM) and a read only memory (ROM), a communication unit that communicates with an external device, and the like.

The input unit 92 acquires information from sensors such as a pressure sensor, a position sensor, a temperature sensor, and an acceleration sensor, a camera, and a microphone (all not shown). When the information that is output by the input unit 92 and acquired by the grasping device control unit 90 is not distinguished, the information is described as input information $I_{IN}$.

The output unit 93 outputs a drive signal to a motor (not shown) or the like for driving a robot. When the information that is output to the output unit 93 by the grasping device control unit 90 is not distinguished, the information is described as output information $I_{OUT}$.

The grasping device control unit 90 outputs the output information $I_{OUT}$ to the output unit 93 based on the input information IN acquired from the input unit 92. Hereinafter, the grasping device control unit 90 will also be referred to as a drive control unit.

The imaging unit 30 outputs the information of the captured image as image information $I_{IMG}$ to the grasping device control unit 90.

The grasping device control unit 90 outputs drive information $I_{DRV}$ including information for driving the arm part 180 and the grasping part 1 connected to the distal end of the arm part 180 based on the acquired image information $I_{IMG}$. Specifically, the grasping device control unit 90 drives, based on specified amount information $I_{TGT}$ indicating the contact state in the case where the specified amount of the grasping object 21 and the contact surface 41 (the first surface) are in contact with each other and the information indicating the contact state captured by the imaging unit 30 when the grasping part module 10 grasps at least a part of the grasping object 21, at least one of the grasping part module 10 and the arm part 180 such that the amount of the grasping object 21 that is grasped approaches the information indicated in the specified amount information $I_{TGT}$. More specifically, the grasping device control unit 90 compares the information indicated in the specified amount information $I_{TGT}$ with the information indicated in the image information $I_{IMG}$, outputs the drive information $I_{DRV}$ based on a comparison result, and drives at least one of the grasping part module 10 and the arm part 180.

Here, the specified amount information $I_{TGT}$ may be stored in the storage unit 84. Specifically, the specified amount information $I_{TGT}$ is the information indicating the contact state in the case where the specified amount of the grasping object 21 and the contact surface 41 (first surface) are in contact with each other. The specified amount is an amount to be grasped by the grasping device 100. The specified amount may be a weight or a volume.

The storage unit 84 may be provided in the grasping device 100.

When the grasping device 100 learns that there is an error between the specified amount information $I_{TGT}$ and an actual specified amount as a result of a plurality of times of grasping, the grasping device 100 may be configured to update the specified amount information $I_{TGT}$ stored in the storage unit 84 by outputting specified amount update information $I_{FB}$ to the storage unit 84.

Figure 6:
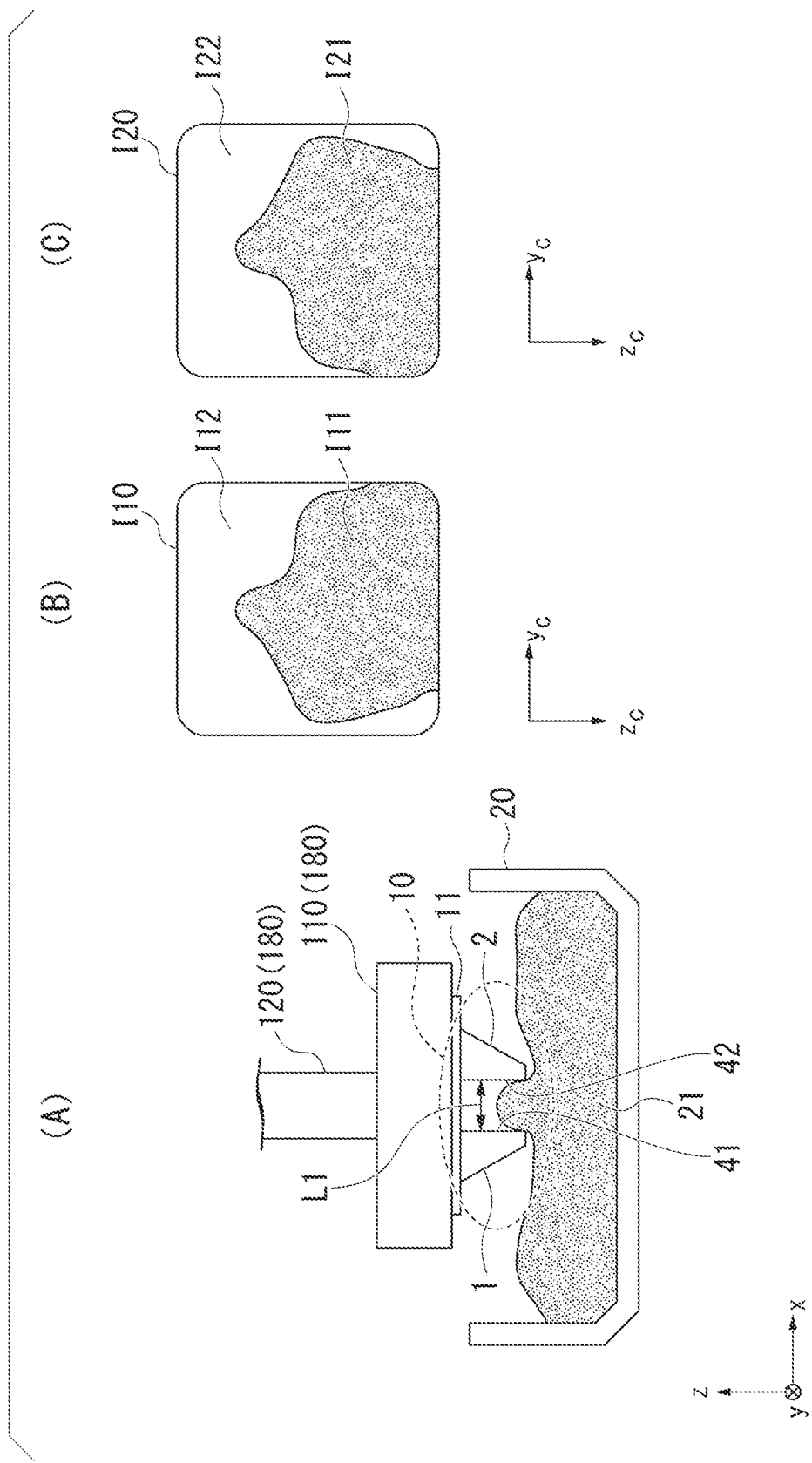
FIG. 6 is a diagram illustrating operations of the grasping part with respect to a grasping object according to the embodiment.

FIG. 6 is a diagram illustrating operations of the grasping part 1 with respect to the grasping object 21 according to the embodiment.

(A) in FIG. 6 is a cross-sectional view of the grasping device 100 in an x-z plane in the case where the grasping part 1 and the grasping object 21 are in contact with each other. (B) in FIG. 6 is a diagram illustrating an example of an image I10 captured by the imaging unit 30 provided in the grasping part 1. (C) in FIG. 6 is a diagram illustrating an example of an image I20 captured by the imaging unit 30 of the support part 2 in a case where the support part 2 includes the imaging unit 30.

The operations of the grasping part 1 with respect to the grasping object 21 will be described with reference to (A) in FIG. 6.

The grasping device control unit 90 controls displacement of the arm part 180 in an x axis direction, the y axis direction, and a z axis direction, and rotatable operation about respective axes. In addition, the grasping device control unit 90 controls a distance L1 between the contact surface 41 of the grasping part 1 and the support surface 42 of the support part 2. That is, the grasping part 1 has seven degrees of freedom in which one degree of freedom is added to six degrees of freedom.

The grasping device control unit 90 adjusts a grasping amount to be the specified amount by changing the position of the grasping part 1 with respect to the grasping object 21.

The imaging unit 30 provided in the grasping part 1 captures the image of the contact surface 41.

(B) in FIG. 6 is the example of the image I10 of the grasping object 21 captured by the imaging unit 30 provided in the grasping part 1. The image I10 is represented by a two-dimensional orthogonal coordinate system of a $y_c$ axis and a $z_c$ axis. A $y_c$-$z_c$ plane indicates an image plane on which an image of a y-z plane in (A) in FIG. 6 is captured.

In the image I10, a portion occupied by the grasping object 21 is referred to as an object image I11. In the image I10, a portion occupied by a background is referred to as a background image 112. The background is a portion where the grasping object 21 is not captured.

The support part 2 may have a configuration the same as the grasping part 1. In this example, the case where the support part 2 has the configuration the same as the grasping part 1 will be described. When the support part 2 has the configuration the same as the grasping part 1, the support part 2 includes the imaging unit 30.

(C) in FIG. 6 illustrates the image I20 of the grasping object 21 captured by the imaging unit 30 provided in the support part 2. The image I20 is represented by the two-dimensional orthogonal coordinate system of the $y_c$ axis and the $z_c$ axis. The $y_c$-$z_c$ plane indicates the image plane on which the image of the y-z plane in (A) in FIG. 6 is captured.

In the image I20, a portion occupied by the grasping object 21 is referred to as an object image I21. In the image I20, a portion occupied by the background is referred to as a background image 122. The background is the portion where the grasping object 21 is not captured.

Figure 7:
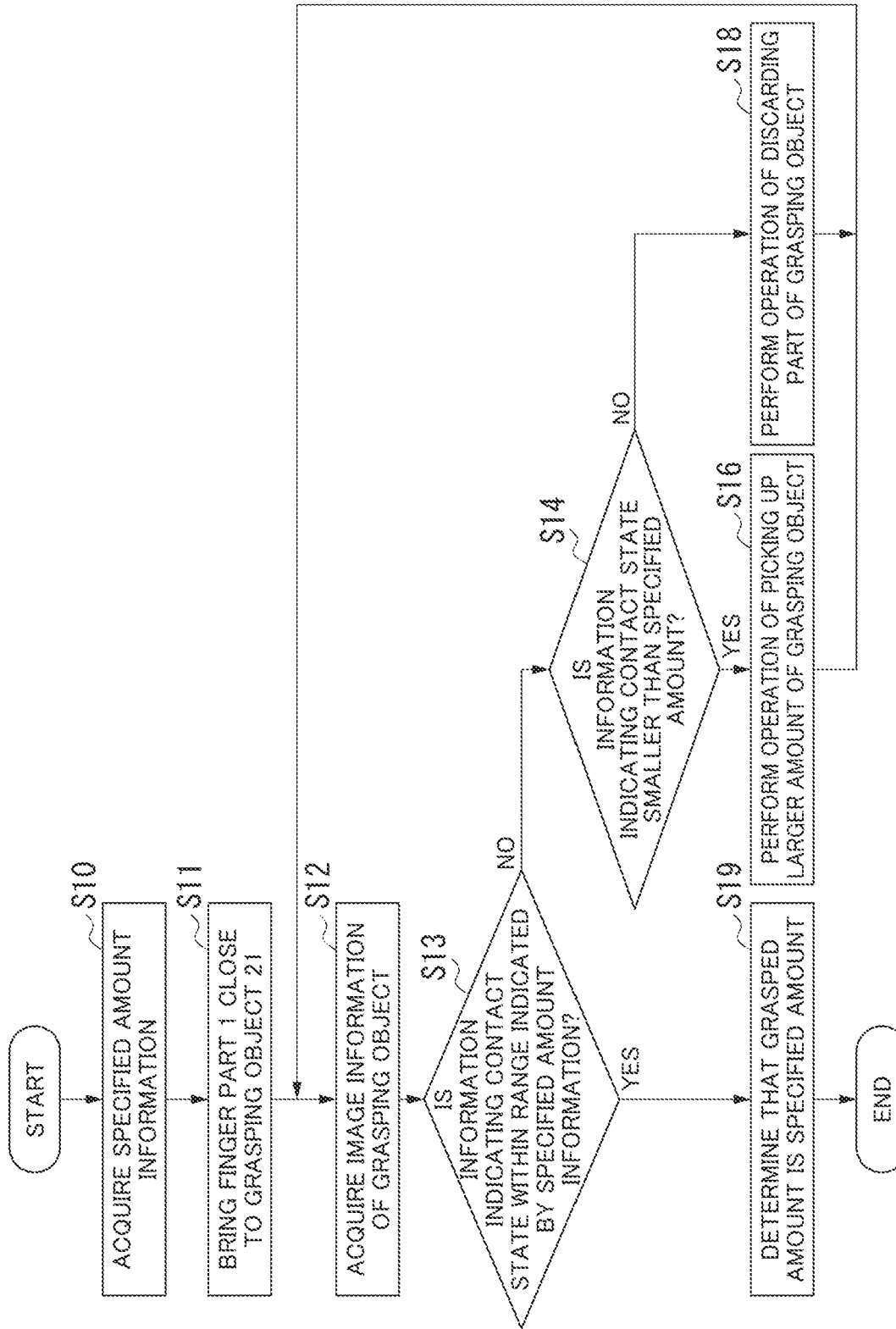
FIG. 7 is a diagram illustrating an example of a series of operations of the grasping device according to the embodiment.

FIG. 7 is a diagram illustrating an example of a series of operations of the grasping device 100 according to the embodiment. The series of operations of the grasping device 100 will be described with reference to the drawing.

(Step S10) The grasping device control unit 90 acquires, from the storage unit 84, the specified amount information $I_{TGT}$ that is the information indicating the specified amount to be grasped. The storage unit 84 in which the specified amount information $I_{TGT}$ is stored may be provided in the grasping device 100 or may not be provided in the grasping device 100. When the storage unit 84 is not provided in the grasping device 100, the grasping device control unit 90 communicates with the storage unit 84 using a communication unit (not shown) to acquire the specified amount information $I_{TGT}$. After acquiring the specified amount information $I_{TGT}$, the grasping device control unit 90 advances the processing to step S11.

(Step S11) The grasping device control unit 90 drives the arm part 180 provided in the grasping part 1 to bring the grasping part 1 close to the grasping object 21. The grasping device control unit 90 advances the processing to step 312.

(Step S12) The imaging unit 30 provided in the grasping part 1 captures an image of the grasping object 21. The grasping device control unit 90 acquires the image information $I_{IMG}$ from the imaging unit 30. The grasping device control unit 90 advances the processing to step 313.

(Step S13) The grasping device control unit 90 compares the specified amount information $I_{TGT}$ acquired from the storage unit 84 with the information indicating the contact state indicated by the image information $I_{IMG}$ acquired from the grasping part 1. Here, the information indicating the contact state may be, for example, a ratio between the image of the object and the image of the background indicated by the image information $I_{IMG}$. When the image information $I_{IMG}$ is the image I10, the information indicating the contact state may be a ratio of an area of the object image I11 to an area of the background image 112.

When the information indicating the contact state indicated by the image information $I_{IMG}$ is within a range indicated by the specified amount information $I_{TGT}$ (that is, step S13; YES), the processing proceeds to step S19. When the information indicating the contact state indicated by the image information $I_{IMG}$; is not within the range indicated by the specified amount information $I_{TGT}$ (that is, step S13; NO), the processing proceeds to step S14.

(Step S14) The grasping device control unit 90 extracts a difference between the information indicating the contact state indicated by the image information $I_{IMG}$ acquired from the grasping part 1 and the information indicated in the specified amount information $I_{TGT}$. When the information indicating the contact state indicated by the image information $I_{IMG}$ acquired from the grasping part 1 is smaller than the information indicated in the specified amount information $I_{TGT}$ (that is, step S14; YES), the processing proceeds to step S16. When the information indicating the contact state indicated by the image information $I_{IMG}$ acquired from the grasping part 1 is larger than the information indicated in the specified amount information $I_{TGT}$ (that is, step S14; NO), the processing proceeds to step 318.

(Step S16) The grasping device control unit 90 drives and controls at least one of the arm part 180 and the grasping part module 10 to further drive the at least one of the arm part 180 and the grasping part module 10 at a position where the difference is further acquired. That is, an operation of picking up (grasping) a larger amount of the grasping object is performed. Specifically, for the arm part 180, for example, when the arm part 180 is shifted downward, a contact area between the grasping part module 10 and the grasping object increases, and a grasping amount is increased. For the grasping part module 10, for example, when an interval between the grasping part 1 and the support part 2 is narrower than that in a state in which the grasping part module 10 is inserted into a mountain of the grasping object, the grasping amount is increased. Further, both the arm part 180 and the grasping part module 10 may perform the respective operations described above to grasp a larger amount of the grasping object. The grasping device control unit 90 drives and controls the arm part 180 and the grasping part module 10 as described above, and then advances the processing to step S12.

(Step S18) The grasping device control unit 90 drives and controls at least one of the arm part 180 and the grasping part module 10 to drive the at least one of the arm part 180 and the grasping part module 10 at a position where the difference is discarded. That is, an operation of picking up (grasping) a smaller amount of the grasping object is performed. Specifically, for the arm part 180, for example, when the arm part 180 is shifted upward, the contact area between the grasping part module 10 and the grasping object decreases, and the grasping amount is reduced. For the grasping part module 10, for example, when the interval between the grasping part 1 and the support part 2 is widened to return to the state in which the grasping part module 10 is inserted into the mountain of the grasping object, the grasping amount is reduced. Further, both the arm part 180 and the grasping part module 10 may perform the respective operations described above to grasp a smaller amount of the grasping object. The grasping device control unit 90 drives and controls the arm part 180 and the grasping part module 10 as described above, and then advances the processing to step S12.

(Step S19) The grasping device control unit 90 moves the grasped grasping object 21 to a predetermined position while maintaining the grasping state of the grasping part 1. The maintaining of the grasping state means, for example, maintaining the distance L1 between the contact surface 41 of the grasping part 1 and the support surface 42 of the support part 2.

Example of Control Based on Ratio Between Object and Background

Figure 8:
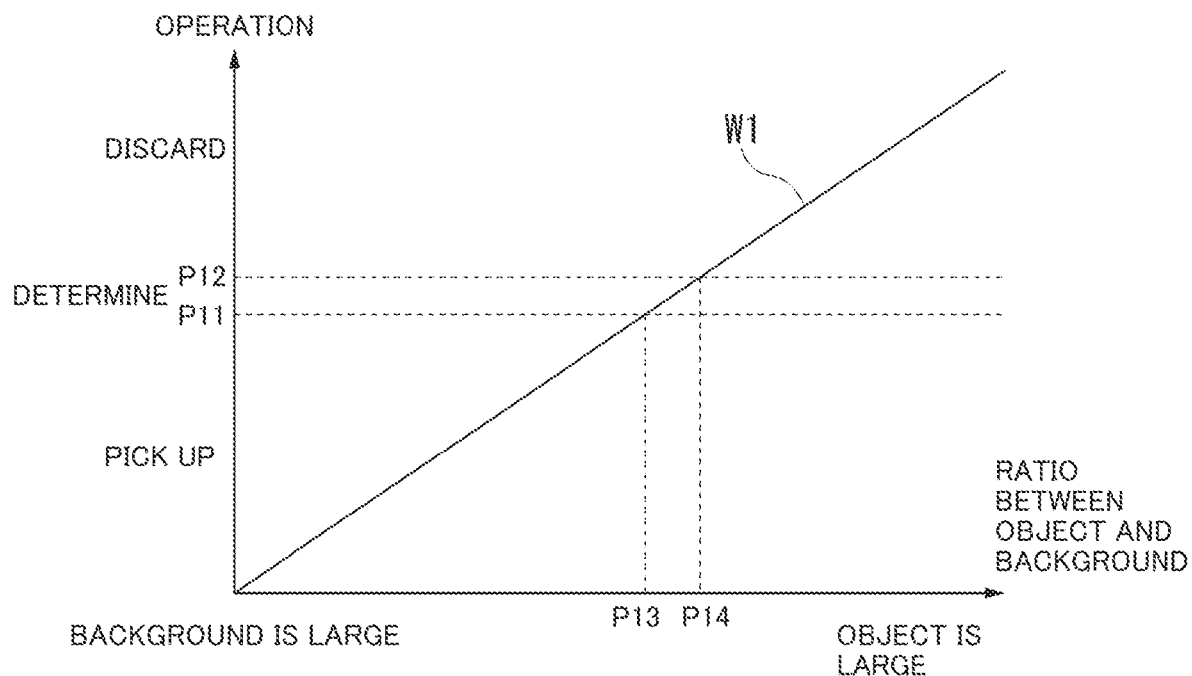
FIG. 8 is a diagram illustrating an example of control based on a ratio between an object and a background according to the embodiment.

FIG. 8 is a diagram illustrating an example of control based on the ratio between the object and the background according to the embodiment.

Here, as an example of a comparison between the specified amount information $I_{TGT}$ and the information indicating the contact state indicated by the image information $I_{IMG}$, the grasping device control unit 90 may perform the control based on the ratio between the object and the background. The example of the control based on the ratio between the object and the background will be described with reference to the drawing.

In the same drawing, a horizontal axis represents the "ratio between the object and the background", a vertical axis represents the "operation" of the arm part 180, and a relationship is represented by a relational expression W1.

The grasping device control unit 90 calculates the ratio between the object and the background indicated in the acquired image. In this example, the "ratio between the object and the background" will be described as the ratio of the object to the ratio of the background. When a calculated value is between a reference sign P13 and a reference sign P14, the grasping device control unit 90 determines the operation. When the calculated value is smaller than the reference sign P13, the grasping device control unit 90 drives the arm part 180 to perform the operation of picking up a larger amount of the grasping object 21. When the calculated value is larger than the reference sign P14, the grasping device control unit 90 drives the arm part 180 to perform the operation of discarding the grasping object 21.

That is, in this example, the grasping device control unit 90 controls the arm part 180 based on the information indicating the ratio between the portion indicating the background and the portion indicating the grasping object, which is the information indicated in the specified amount information, and the image indicating the contact state captured by the imaging unit 30.

In this example, the relational expression W1 is described as a linear function, but the relational expression W1 is not limited to this example. The relational expression W1 may be obtained by a regression model such as a neural network or a support vector machine.

Example of Control Based on Ratio of Edge

Figure 9:
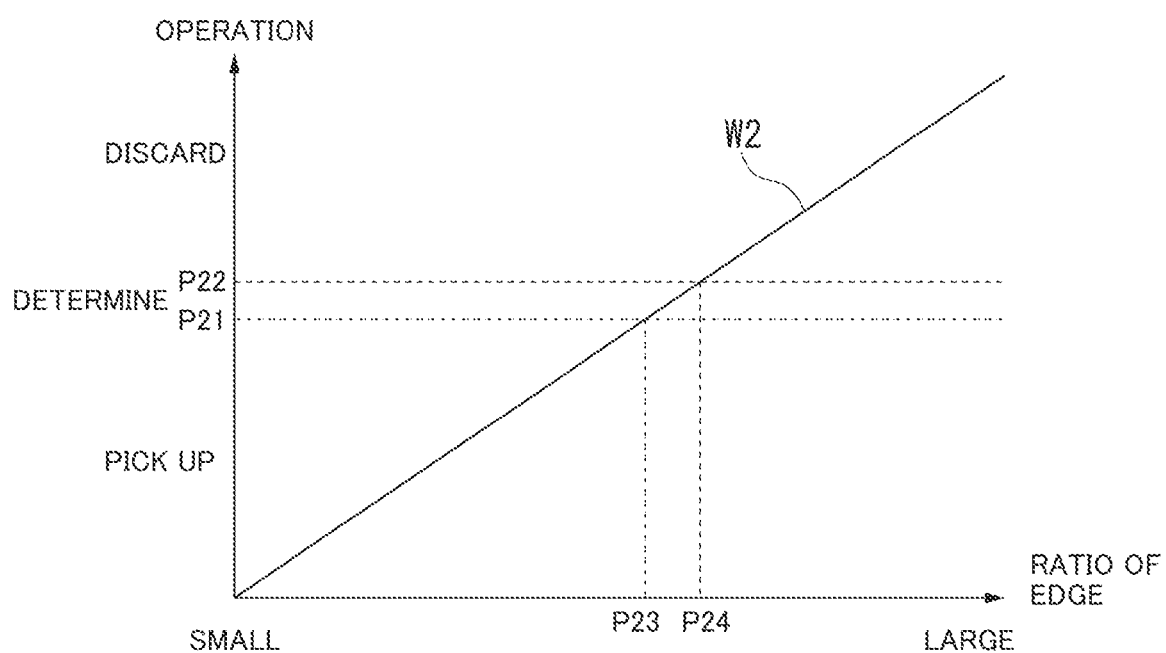
FIG. 9 is a diagram illustrating an example of control based on a ratio of an edge according to the embodiment.

FIG. 9 is a diagram illustrating an example of control based on a ratio of an edge in the embodiment.

Here, as the example of the comparison between the specified amount information $I_{TGT}$ and the information indicating the contact state indicated by the image information $I_{IMG}$, the grasping device control unit 90 may perform the control based on the ratio of the edge indicated by the image information $I_{IMG}$.

Specifically, a weight indicated by the specified amount information $I_{TGT}$ and the ratio of the edge indicated by the image information $I_{IMG}$ may have a positive correlation. For example, in a case where a focal position of the imaging unit 30 is adjusted to the contact surface 41, the image of the grasping object 21 in the image information $I_{IMG}$ is more clearly captured as the grasping object 21 approaches (comes into close contact with) the contact surface 41, and therefore, the ratio of the edge indicated by the image information $I_{IMG}$ is increased. On the other hand, as the grasping object 21 moves away from the contact surface 41 (a degree of close contact decreases), an amount of blur increases, and therefore, the ratio of the edge indicated by the image information $I_{IMG}$, decreases. That is, there is a correlation between the ratio of the edge indicated by the image information $I_{IMG}$ and the distance between the grasping object 21 and the contact surface 41. Since the weight is larger as the larger amount of the grasping object 21 is in close contact with the contact surface 41, the weight indicated in the specified amount information $I_{TGT}$ and the ratio of the edge indicated in the image information $I_{IMG}$ may have a positive correlation.

The example of the control based on the ratio of the edge indicated by the image information $I_{IMG}$ will be described with reference to the drawing.

In the same drawing, the horizontal axis represents the "ratio of the edge", the vertical axis represents the "operation" of the arm part 180, and a relationship is represented by a relational expression W2.

The grasping device control unit 90 calculates the edge of the acquired image. For example, the grasping device control unit 90 calculates the edge of the image indicated by the image information $I_{IMG}$ by an image processing such as applying a differential filter. In this example, the edge means a portion where luminance change of the image indicated by the image information $I_{IMG}$ is large. When the calculated value is between a reference sign P23 and a reference sign P24, the grasping device control unit 90 determines the operation. When the calculated value is smaller than the reference sign P23, the grasping device control unit 90 drives the arm part 180 to perform the operation of picking up a larger amount of the grasping object 21. When the calculated value is larger than the reference sign P24, the grasping device control unit 90 drives the arm part 180 to perform the operation of discarding the grasping object 21.

That is, in this example, the grasping device control unit 90 controls the arm part 180 based on the information indicating the ratio of the portion where the luminance change of the grasping object 21 is large, which is the information indicated in the specified amount information, and the image indicating the contact state captured by the imaging unit 30.

In this example, the relational expression W2 is described as a linear function, but the relational expression W2 is not limited to this example. The relational expression W2 may be obtained by a regression model such as a neural network or a support vector machine.

Example of Control Based on Color of Image

Figure 10:
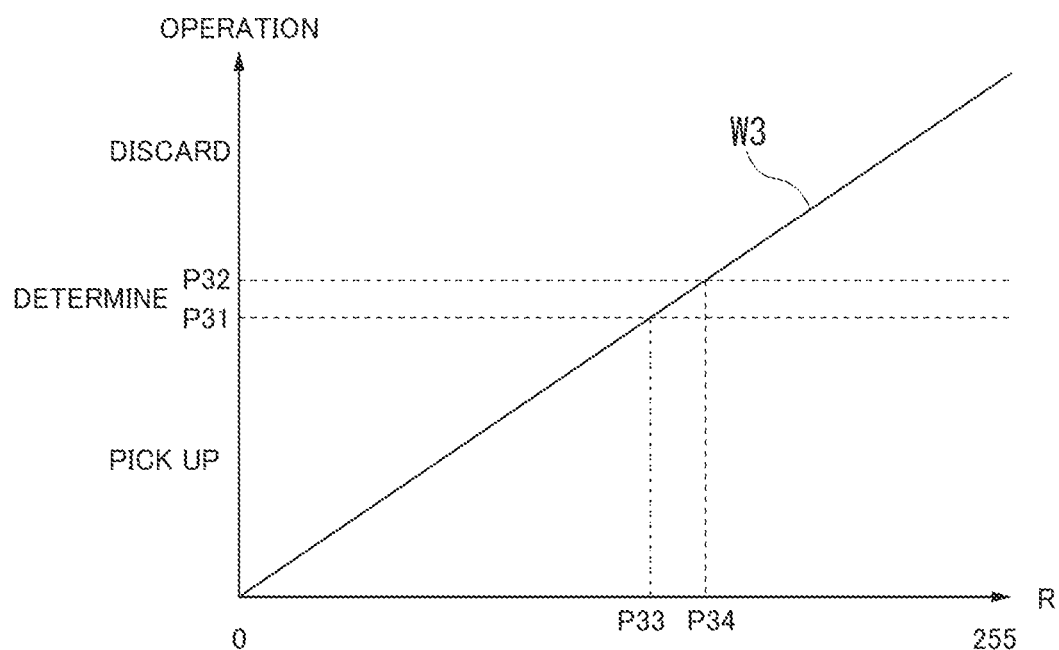
FIG. 10 is a diagram illustrating an example of control based on a color of an image according to the embodiment.

FIG. 10 is a diagram illustrating an example of control based on a color of the image according to the embodiment.

Here, as the example of the comparison between the specified amount information $I_{TGT}$ and the information indicating the contact state indicated by the image information $I_{IMG}$, the grasping device control unit 90 may perform the control based on the color of the image indicated by the image information $I_{IMG}$. The example of the control based on the color of the image indicated by the image information $I_{IMG}$ will be described with reference to the drawing.

In the same drawing, the horizontal axis represents "R", the vertical axis represents the "operation" of the arm part 180, and a relationship is represented by a relational expression W3. In this example, a case where the color is R (red) will be described, but a relational expression based on three axes of RGB may be used.

The grasping device control unit 90 calculates the color of the acquired image. For example, the grasping device control unit 90 calculates an average value of colors of the image indicated by the image information $I_{IMG}$. In this example, the color refers to an average color of the image indicated by the image information $I_{IMG}$, but the color may be the color of a portion occupied by the object, and the embodiment may be configured to perform the operation based on the color of each point of the image information $I_{IMG}$.

When the calculated value is between a reference sign P33 and a reference sign P34, the grasping device control unit 90 determines the operation. When the calculated value is smaller than the reference sign P33, the grasping device control unit 90 drives the arm part 180 to perform the operation of picking up a larger amount of the grasping object 21. When the calculated value is larger than the reference sign P34, the grasping device control unit 90 drives the arm part 180 to perform the operation of discarding the grasping object 21.

That is, in this example, the grasping device control unit 90 controls the arm part 180 based on the information indicating the color of the grasping object 21, which is the information indicated by the specified amount information, and the image indicating the contact state captured by the imaging unit 30.

In this example, the relational expression W3 is described as a linear function, but the relational expression W3 is not limited to this example. The relational expression W3 may be obtained by a regression model such as a neural network or a support vector machine.

Summary of Effects of Embodiment

As described above, the grasping device 100 of the present embodiment includes the grasping part 1 and the arm part 180, so as to grasp the specified amount of the grasping object 21. The grasping device control unit 90 controls the arm part 180 based on the image acquired by the imaging unit 30 provided in the grasping part 1. The grasping device control unit 90 compares the information acquired from the storage unit 84 with the information indicated in the image acquired by the imaging unit 30, and controls the arm part 180.

Therefore, the grasping device 100 can grasp the specified amount by controlling the arm part 180 based on the image acquired by the imaging unit 30 provided in the grasping part 1.

Further, the grasping device 100 of the present embodiment includes the imaging unit 30 at a position where the image of the grasping object 21 can be captured from the back surface of the contact surface 41 of the grasping part 1.

For example, compared to a case where a camera is provided on a ceiling as in the related art, the grasping device 100 of the present embodiment can acquire more information on the grasping object 21.

Therefore, according to the present embodiment, the grasping device 100 can more accurately grasp the specified amount from the grasping object 21.

In addition, the grasping device 100 of the present embodiment controls the arm part 180 based on the information indicating the ratio between the portion indicating the background and the portion indicating the grasping object.

Therefore, the grasping device control unit 90 can estimate a amount grasped by the grasping part 1, and can grasp the specified amount.

In addition, the grasping device 100 of the present embodiment controls the arm part 180 based on the ratio of the portion where the luminance change of the grasping object 21 is large.

Here, the grasping object 21 grasped by the grasping device 100 of the present embodiment may be soft. Weights may be different between a case where the grasping object 21 is soft and a case where the grasping object 21 is hard.

Therefore, according to the grasping device 100 of the present embodiment, the specified amount can be estimated according to the state of the grasping object 21 (for example, softness of the grasping object 21) by controlling the arm part 180 based on the ratio of the portion where the luminance change of the grasping object 21 is large.

In addition, the grasping device 100 of the present embodiment controls the arm part 180 based on the color of the grasping object 21.

Here, the weight of the grasping object 21 grasped by the grasping device 100 of the present embodiment may be different according to the color. For example, a cabbage of yellow-green may be light, and a cabbage of deep green may be heavy.

Therefore, according to the grasping device 100 of the present embodiment, the specified amount can be more accurately estimated by controlling the arm part 180 based on the color of the grasping object 21.

Some or all of the functions of the respective units provided in the grasping device 100 in the above-described embodiment may be implemented by recording a program for implementing these functions in a computer-readable recording medium and causing a computer system to read and execute the program recorded in the recording medium. Here, the "computer system" includes hardware such as an OS or a peripheral device.

Further, "computer-readable recording medium" refers to a storage unit such as a portable medium such as a magneto-optical disk, a ROM, and a CD-ROM, and a hard disk built in the computer system. Further, the "computer-readable recording medium" may also include a recording medium that retains a program dynamically in a short time, such as a communication line for transmitting a program via a network such as the Internet, or a recording medium that retains a program for a predetermined time, such as a volatile memory in the computer system serving as a server or a client in this case. Further, the program may be a program for implementing some of the functions described above, or may be a program capable of implementing the above-described functions in combination with the program already recorded in the computer system.

Although the embodiments for carrying out the invention have been described above using the embodiments, the invention is not limited to these embodiments, and various modifications and substitutions can be made without departing from the gist of the invention.

REFERENCE SIGN LIST

1: grasping part
2: support part
10: grasping part module
11: connection part
100: grasping device
20: container
21: grasping object
22: specified amount
110: distal end part
120: upper arm part
130: joint part
140: lower arm part
150: main horizontal shaft part
160: main vertical shaft part
170: base part
180: arm part
90: grasping device control unit
30: imaging unit
41: contact surface
42: support surface
43: contact state detection unit
45: marker
50: frame
70: hard layer
92: input unit
93: output unit
84: storage unit

The invention claimed is:

1. A grasping device, comprising:
a grasping part module including a first surface and a second surface and configured to grasp an object between the first surface and the second surface;
an arm part configured to change a position of the grasping part module;
an imaging unit provided at a position that moves together with the grasping part module and configured to capture an image of at least a part of the object; and
a control unit configured to compare specified amount information indicating a contact state in a case where a specified amount of the object and the first surface are in contact with each other, and information indicating a contact state captured by the imaging unit when the grasping part module grasps at least a part of the object, output drive information for driving the grasping part module or the arm part based on the result of the comparison, and control at least one of the grasping part module and the arm part such that an amount of the object that is grasped approaches the specified amount.

2. The grasping device according to claim 1, wherein the imaging unit is provided on a back surface side of the first surface and at a position where an image of the object is able to be captured.

3. The grasping device according to claim 1, wherein the control unit is configured to control at least one of the grasping part module and the arm part based on the specified amount information and information indicating a contact state captured by the imaging unit when the grasping part module grasps at least a part of the object, the specified amount information being information indicating a ratio between a portion indicating a background and a portion indicating the object.

4. The grasping device according to claim 1, wherein the control unit is configured to control at least one of the grasping part module and the arm part based on the specified amount information and information indicating a contact state captured by the imaging unit when the grasping part module grasps at least a part of the object, the specified amount information being information indicating a ratio of a portion where luminance change of the object is large.

5. The grasping device according to claim 1, wherein the control unit is configured to control at least one of the grasping part module and the arm part based on the specified amount information and information indicating a contact state captured by the imaging unit when the grasping part module grasps at least a part of the object, the specified amount information being information indicating a color of the object.

6. A control method for a grasping device, the grasping device including:
a grasping part module including a first surface and a second surface and configured to grasp an object between the first surface and the second surface;
an arm part configured to change a position of the grasping part module; and
an imaging unit provided at a position that moves together with the grasping part module and configured to capture an image of at least a part of the object,
the control method comprising:
a control step of comparing specified amount information indicating a contact state in a case where a specified amount of the object and the first surface are in contact with each other, and information indicating a contact state captured by the imaging unit when the grasping part module grasps at least a part of the object, outputting drive information for driving the grasping part module or the arm part based on the result of the comparison, and controlling at least one of the grasping part module and the arm part such that an amount of the object that is grasped approaches the specified amount.

7. A program configured to cause a computer connected to a grasping device to execute a control step, wherein
the grasping device includes:
a grasping part module including a first surface and a second surface and configured to grasp an object between the first surface and the second surface;
an arm part configured to change a position of the grasping part module; and
an imaging unit provided at a position that moves together with the grasping part module and configured to capture an image of at least a part of the object, and
the control step is to compare specified amount information indicating a contact state in a case where a specified amount of the object and the first surface are in contact with each other, and information indicating a contact state captured by the imaging unit when the grasping part module grasps at least a part of the object, output drive information for driving the grasping part module or the arm part based on the result of the comparison, and control at least one of the grasping part module and the arm part such that an amount of the object that is grasped approaches the specified amount.

* * * * *